United States Patent [19]

Schmoock et al.

[11] 4,417,479

[45] Nov. 29, 1983

[54] ELECTROMAGNETIC FLOWMETER SYSTEM HAVING A FEEDBACK LOOP

[75] Inventors: Roy F. Schmoock, Yardley; Herbert A. Shauger, Doylestown, both of Pa.

[73] Assignee: Fischer & Porter Company, Warminster, Pa.

[21] Appl. No.: 298,457

[22] Filed: Sep. 1, 1981

[51] Int. Cl.³ .............................................. G01F 1/60
[52] U.S. Cl. ............................. 73/861.16; 73/861.17
[58] Field of Search ........................ 73/861.16, 861.17

[56] References Cited

U.S. PATENT DOCUMENTS

| | | | |
|---|---|---|---|
| 4,089,219 | 5/1978 | Suzuki | 73/861.16 |
| 4,227,408 | 10/1980 | Schmoock et al. | 73/861.17 |
| 4,296,636 | 10/1981 | Mannherz | 73/861.17 X |
| 4,309,909 | 1/1982 | Grebe, Jr. et al. | 73/861.16 X |
| 4,357,835 | 11/1982 | Kayama | 73/861.17 |

*Primary Examiner*—Charles A. Ruehl

*Attorney, Agent, or Firm*—Michael Ebert

[57] ABSTRACT

An electromagnetic flowmeter system in which the flow rate signal yielded by the flowmeter primary is applied as an input to a secondary which acts to measure the ratio of the input signal to a reference voltage proportional to the magnetic flux established in the primary, the reference voltage reflecting variations in this flux. Ratio measurement is effected in the secondary by means of a feedback loop in which the reference voltage is pulse-modulated by pulses having a constant width and a frequency which varies in accordance with the flow rate, the pulses having a duty cycle sufficient to cancel the input signal at the input of a summing amplifier. When the variable frequency pulse output from the secondary accurately represents the flow rate, the pulse-modulated reference voltage will then be equal in magnitude and opposite in phase to the input signal.

7 Claims, 3 Drawing Figures

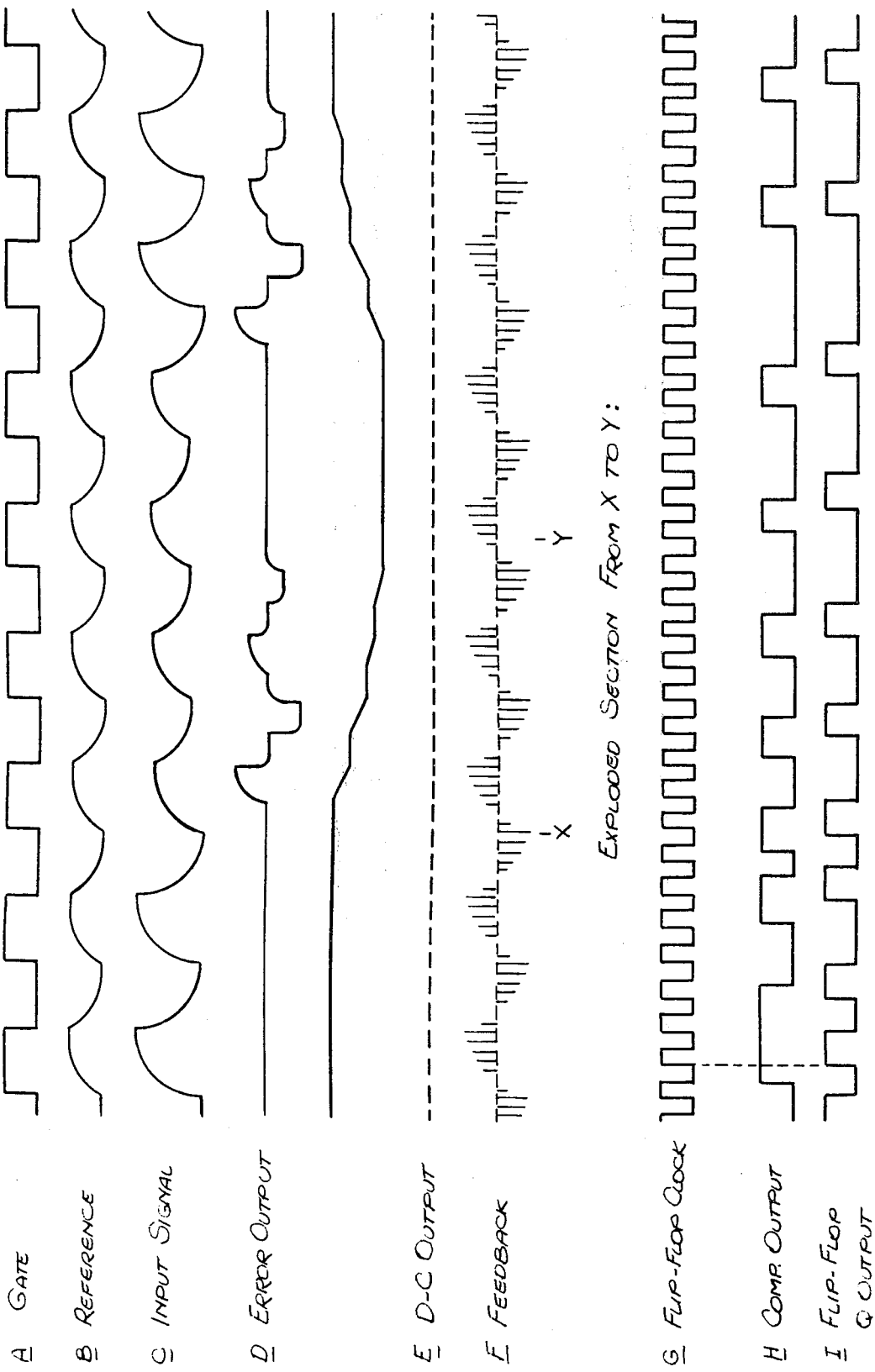

ELECTROMAGNETIC FLOWMETER SYSTEM HAVING A FEEDBACK LOOP

BACKGROUND OF THE INVENTION

This invention relates generally to electromagnetic flowmeter systems, and more particularly to a secondary responsive to the electrode signal from the flowmeter primary, the secondary including a crystal-controlled feedback loop which functions to compensate for the adverse effect of fluctuations in the flowmeter drive current and other variables to provide a signal that accurately reflects the flow rate.

In an electromagnetic flowmeter system, the liquid whose flow rate is to be measured is conducted through a flow tube of a flowmeter primary provided with a pair of diametrically-opposed electrodes, a magnetic field perpendicular to the longitudinal axis of the tube being established by an elecromagnet. When the flowing liquid intersects this field, a voltage is induced therein which is transferred to the electrodes. This voltage, which is proportional to the average velocity of the liquid and hence to its average volumetric rate, is then amplified and processed in a converter or secondary to actuate a recorder or indicator.

The magnetic field may be either direct or alternating in nature, for in either event the amplitude of voltage induced in the liquid passing through the field will be a function of its flow rate. However, when operating with direct magnetic flux, the D-C signal current flowing through the liquid acts to polarize the electrodes, the magnitude of polarization being proportional to the time integral of the polarization current. With alternating magnetic flux operation, polarization is rendered negligible, for the resultant signal current is alternating and therefore its integral does not build up with time.

Through A-C operation as disclosed, for example, in the Cushing U.S. Pat. No. 3,693,439 is clearly advantageous in that polarization is obviated and the A-C flow induced signal may be more easily amplified, it has distinct drawbacks. The use of an alternating flux introduces spurious voltages that are unrelated to flow rate and, if untreated, give rise to inaccurate indications.

All of the adverse effects encountered in A-C operation of electromagnetic flowmeters can be attributed to the rate of change of the flux field (d$\phi$)/dt, serving to induce unwanted signals in the pick-up loop. If, therefore, the rate of change of the flux field could be reduced to zero value, then the magnitude of quadrature and of its in-phase component would become non-existent. Zero drift effects would disappear.

When the magnetic flux field is a steady state field, as, for example, with continuous d-c operation, the ideal condition (d$\phi$)/dt=0 is satisfied. But, as previously noted, d-c operation to create a steady state field is not acceptable, for galvanic potentials are produced and polarization is encountered.

In the U.S. Pat. No. to Mannherz et al., 3,783,687, whose entire disclosure is incorporated herein by reference, there is disclosed an electromagnetic flowmeter in which the excitation current for the electromagnetic coil is a low-frequency wave serving to produce a periodically-reversed steady state flux field, whereby unwanted in-phase and quadrature components are minimized without giving rise to polarization and galvanic effects.

While the signal yielded by the electrodes of the flowmeter primary is a function of the flow rate of the fluid being metered, it is also affected by changes in magnetic flux arising from fluctuations in the drive current for exciting the electromagnet and to flux changes produced by other factors such as temperature variations. To compensate for these variations, it is known to derive a reference voltage from the drive current and to divide the signal by the reference current to provide a ratio measurement.

In our prior art U.S. Pat. No. 4,167,871, entitled "Bi-Directional Electromagnetic Flowmeter," the signal from the flowmeter primary which is excited by a low-frequency wave is converted in a secondary into a variable-frequency pulses which exhibit a duty cycle proportional thereto, the pulses being sampled in a sampling circuit included in a feedback loop leading to one input of a summing junction. Also applied to this junction is the electrode signal, the output of the junction being fed to a demodulator. The sampling circuit acts to sample the reference voltage derived from the drive circuit of the flowmeter primary whereby the signal output of the secondary is compensated for variations in the excitation current in the primary.

The drawback to our prior arrangement is that no means are provided to stabilize the variable-frequency pulses; hence the effect of temperature variations and other variables in the secondary are not corrected.

SUMMARY OF INVENTION

In view of the foregoing, the main object of this invention is to provide an electromagnetic flowmeter system which is subject to power line fluctuations and other variables and yet is capable of accurately measuring the flow rate of fluid.

More particularly, an object of this invention is to provide a flowmeter system whose primary is excited by a low-frequency wave, the signal yielded by the primary being applied as an input to a secondary including a crystal-controlled feedback loop to compensate for the adverse effect of fluctuations in the primary drive current and other variables to provide an output signal that accurately reflects flow rate.

Also an object of the invention is to provide an efficient and reliable secondary for a flowmeter system which lends itself to low-cost production.

Briefly stated, these objects are attained in an electromagnetic flowmeter system in which the flow rate signal yielded by the flowmeter primary is applied as an input to a secondary which acts to measure the ratio of the input signal to a reference voltage proportional to the magnetic flux established in the primary, the reference voltage reflecting variations in this flux.

Ratio measurement is effected in the secondary by means of a feedback loop in which the reference voltage is pulse-modulated by pulses having a constant width as governed by a crystal controlled time base, and a frequency which varies in accordance with the flow rate, the pulses having a duty cycle which is sufficient to cancel the input signal at the input of summing amplifier. When the output from the secondary accurately represents the flow rate, the pulse-modulated reference voltage will then be equal in magnitude and opposite in phase to the input signal.

OUTLINE OF DRAWINGS

For a better understanding of the invention as well as other objects and further features thereof, reference is made to the following detailed description to be read in conjunction with the accompanying drawings, wherein:

FIG. 3 is a timing diagram of the feedback loop.

DESCRIPTION OF INVENTION

The Flowmeter Primary

Figure 1:
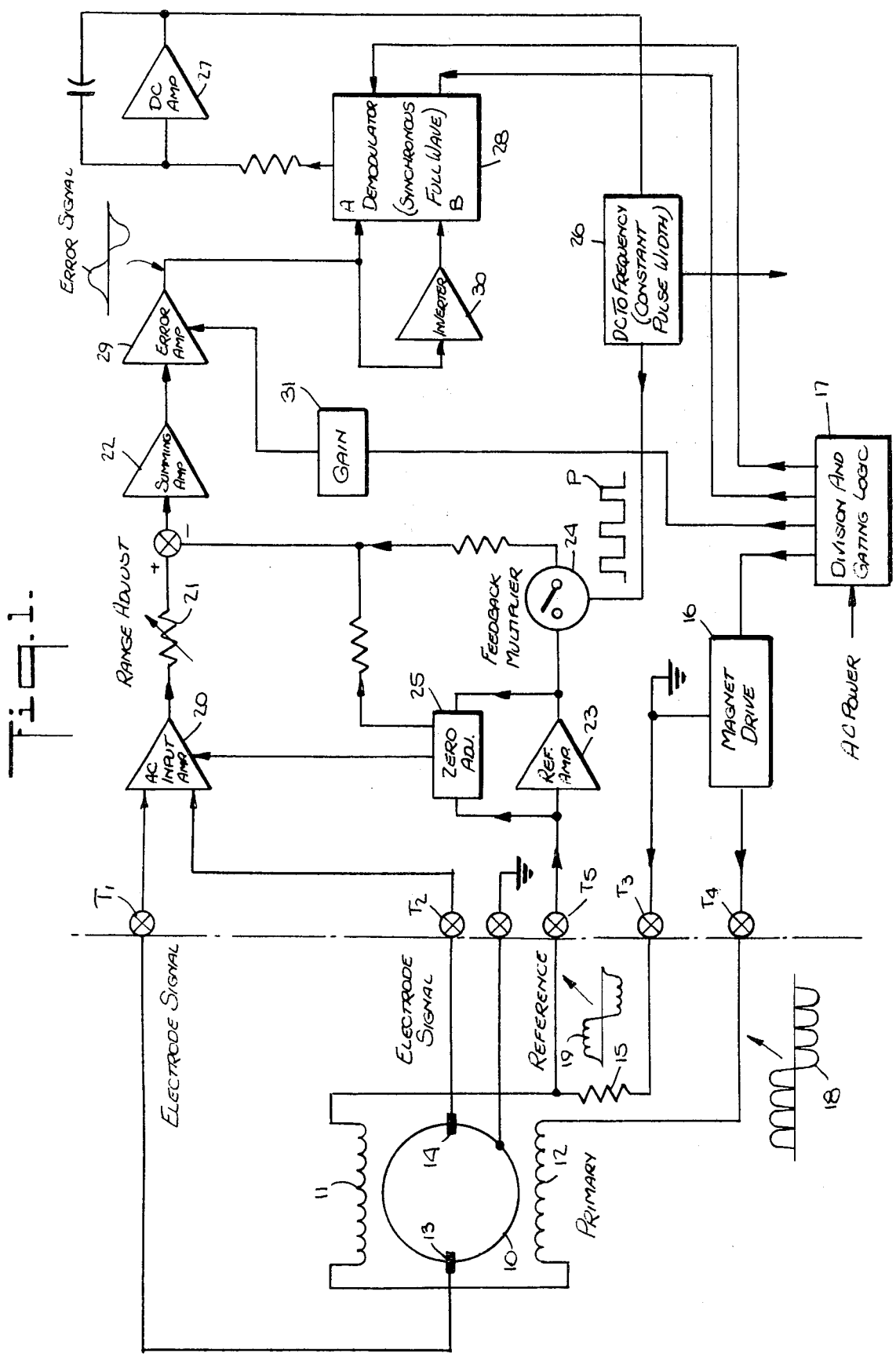
FIG. 1 is a block diagram of an electromagnetic flowmeter system in accordance with the invention.

Referring now to FIG. 1, there is shown an electromagnetic flowmeter system in accordance with the invention whose primary produces a low-level, a-c signal output having an amplitude proportional to the flow rate of the fluid being metered and whose secondary converts this signal into an output signal constituted by pulses whose frequency varies in accordance with the flow rate.

The flowmeter primary includes a flow tube 10 through which the liquid to be metered is conducted. An electromagnet having oppositely disposed coils 11 and 12 is provided to establish a magnetic field transverse to the direction of flow, the fluid flow being parallel to the longitudinal axis of the tube. Electrodes 13 and 14 in contact with the flowing fluid are disposed at diametrically-opposed points on the flow tube along an axis which is perpendicular both to th longitudinal direction of flow and the transverse magnetic field.

A voltage is induced in the liquid whose flow intersects the magnetic field, this voltage being transferred to the electrodes to produce a signal at the flowmeter output terminals $T_1$ and $T_2$ that reflects the flow rate. This signal is referred to as the flow-induced signal to distinguish it from spurious signal components that are independent of flow rate.

Serially-connected excitation coils 11 and 12 are coupled to drive terminals $T_3$ and $T_4$ through a resistor 15. The excitation coils are engergized by a relatively low-frequency square wave derived from a drive circuit 16, which in practice may be constituted by a full-wave rectifier connected to the a-c power line, the output of the rectifier being coupled to terminals $T_3$ and $T_4$ by electronic switching means which periodically reverse the polarity of the voltage supplied thereto at a rate which is a sub-multiple of the power line frequency (i.e., 50 or 60 Hz), as determined by a frequency division and gating logic device 17. Thus applied to device 17 as a clock signal is the power line frequency, the divider yielding low-frequency pulses which actuate the switching means in drive circuit 16. A more detailed description of this drive circuit is set forth in our prior U.S. Pat. No. 4,167,871.

Thus the drive voltage has the form shown by waveform 18, each cycle of which is composed of a continuous train of half cycle pulses of one polarity succeeded by a similar train of pulses of the reverse polarity. Because of the voltage drop produced by the flow of excitation current across reference resistor 15, the waveform 19 of the reference voltage is similar to that of the drive current and therefore reflects flux changes resulting from power line fluctuations.

The Flowmeter Secondary

The electrode signal yielded at terminals $T_1$ and $T_2$ of the primary is applied as an input to a secondary that measures the ratio of this input signal to the reference voltage derived from resistor 15. This reference is proportional to the magnetic flux established in the flow tube and follows variations therein as a result of changes in drive current, temperature effects, etc.

Ratio measurement is achieved in the secondary by means of a feedback loop in which the reference voltage is pulse-modulated with pulses having a constant width and a variable frequency whose duty cycle is sufficient to cancel the input signal at the input of a summing amplifier. When the correct flow rate is indicated, the pulse-modulated reference will then be equal in magnitude and opposite in phase to the input signal.

In the secondary, the input signal from the primary is applied to the first stage thereof which is an a-c preamplifier 20 whose output is fed through a span-adjusting resistor 21 to the input of a summing amplifier 22. The reference voltage developed across resistor 15 in the primary is applied to terminal $T_5$ which is connected to the input of a reference amplifier 23. The output of reference amplifier 23 is applied through a feedback multiplier 24 to the input of summing amplifier 22.

A zero-adjustment device 25 responsive to the difference between the input and output of reference amplifier 23 acts to apply zero adjustment control voltages to a-c amplifier 20 and the input to summing amplifier 22.

Feedback multiplier 24 is essentially an electronic switch that is actuated by variable frequency pulses P applied thereto by a D-C-to-Frequency converter 26 to pulse-modulate the reference voltage supplied to the input of summing amplifier 22. The d-c input to D-C-to-Frequency converter 26 is derived from a d-c amplifier 27 coupled to the output of a synchronous full-wave demodulator 28.

The input signal and the pulse-modulated reference voltage applied to the input of summing amplifier 22 are compared therein. Any difference resulting from this comparison arising from a change in the flow rate input signal is amplified in an error amplifier 29 whose output is applied directly to one electric switching element 28A of demodulator 28. The output of error amplifier 29 is also applied through an inverter 30 to the other electronic switching element 28B of the demodulator.

These switching elements are actuated in phase opposition by gate signals obtained from gating logic 17. Gate signals are also applied to a gain control switching element 31 which controls the gain of error amplifier 29. The gate pulses are shown in line A of the timing diagram in FIG. 3. Gating of demodulator 28 and of error amplifier 24 serves to render these devices operative only during the time interval when the magnetic flux has reached a steady state condition, thereby eliminating any transient components from the flow rate signal.

The timing relationships between the gate pulses which appear in line A of FIG. 3 and the reference voltage and the input signal are shown in lines B and C. The output of error amplifier 29 which represents the result of a comparison of the reference voltage and input signal is shown on line D.

Figure 2:
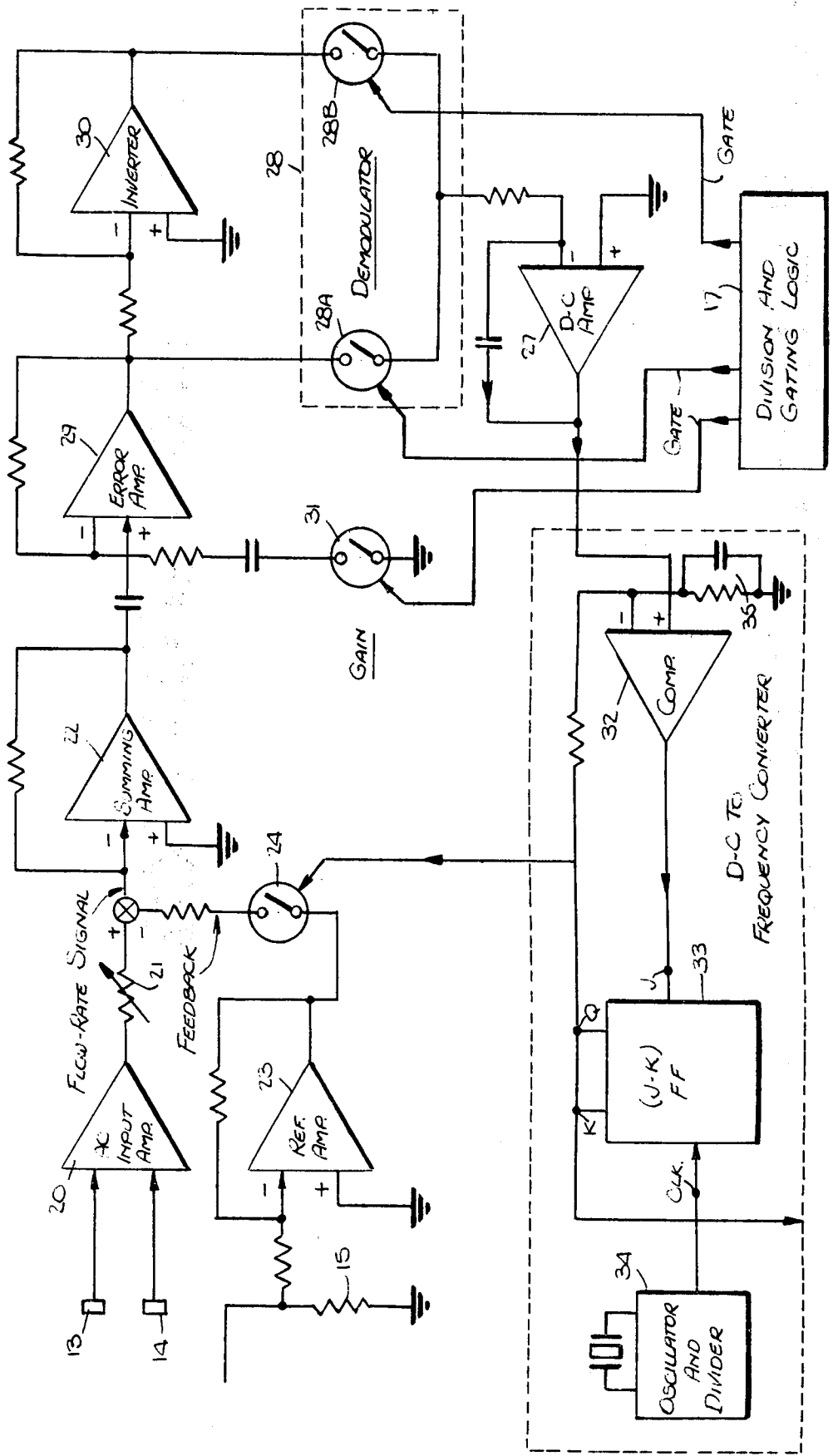
FIG. 2 is a schematic diagram of the feedback loop included in the secondary of the system.

D-C-to-Frequency converter 26, which is shown in general block form in FIG. 1 and in greater schematic detail in FIG. 2, generates pulses of constant width at a frequency which depends on the amplified d-c output of synchronous demodulator 28 yielded by d-c amplifier 27. This d-c output is shown on line E of the timing diagram in FIG. 3.

D-C-to-Frequency converter 26, as shown in FIG. 2, includes a comparator 32 to whose non-inverting input (+) is applied the d-c output of amplifier 27, the inverting input (−) being connected to ground through an R-C network 35 having a predetermined time constant.

Any d-c signal from demodulator 28 which is passed though amplifier 27 to comparator 32 of the converter causes an output change which is applied by comparator 32 to the J terminal of a flip-flop 33 to whose CLK terminal are applied clock pulses. These clock pulses, which are shown in line G of the timing diagram, originate in a crystal-controlled oscillator-divider providing a stable time base. The output of comparator 32 is shown in line H of the timing diagram.

If the signal applied to the J terminal of the flip-flop 33 places a high logic level thereon, then the Q output thereof, which is shown in line I of the timing diagram, will change state on the positive clock leading edge. Should the signal from comparator 32 assume a low logic level, the Q output of the flip-flop will either assume or remain at a low logic state. A portion of the Q output is fed back to the inverting input of comparator 32, the time constant of R-C network 35 promoting the proper logical action of this circuit.

Flip-flop 33 will therefore produce pulses having a constant width and a variable frequency, which pulses are applied to frequency multipler 24 to modulate the reference voltage fed to the input of the summing amplifier. The resultant feedback is shown in line F of the timing diagram.

Thus the feedback loop operates to produce variable-frequency pulses whose duty cycle is directly proportional to the flow rate input signal and whose constant pulse width is a multiple of the period of the crystal oscillator in time base 34. The pulse output of the flip-flop modulates the reference voltage and results in the application to the summing amplifier, to which is also applied an input signal of a pulse-modulated reference voltage equal in magnitude to the input signal and opposite in phase thereto, thereby restoring a zero summing condition.

In practice, the pulses from D-C-to-Duty Cycle converter 26 may be applied to a Duty-Cycle-to-D-C converter which converts the applied pulses into an analog d-c output proportional to fluid flow rate.

While there has been shown and described a preferred embodiment of an electromagnetic flowmeter system having a feedback loop in accordance with the invention, it will be appreciated that many changes and modifications may be made therein without, however, departing from the essential spirit thereof.

We claim:

1. An electromagnetic flow-meter system comprising:

A a primary provided with a flow tube through which the fluid to be metered flows to intersect a magnetic field established by an electromagnet excited by a low-frequency drive current which also passes through a resistor to produce a reference voltage that depends on the intensity of the magnetic field, the flowing fluid inducing a signal in the tube electrodes whose amplitude depends on the flow rate of the fluid; and B a secondary to measure the ratio of the signal to the reference voltage, said secondary including a summing amplifier to whose input is applied said signal and the reference voltage, a demodulator coupled to the output of the summing amplifier, and yielding a d-c output, and a feedback loop between the demodulator output and the input to the summing amplifier, the loop including a converter to charge the d-c output of the demodulator into pulses of constant width and having a frequency which varies with the flow rate of the fluid, and means a pulse-modulate the reference voltage applied to the input of said summing amplifier with the variable frequency pulses, said pulses having a duty cycle that is sufficient to cancel the signal applied to the input of said summing amplifier whereby the pulse-modulated reference voltage is equal in magnitude and opposite in phase to the input signal and the resultant pulse frequency is accurately indicative of the flow rate.

2. A system as set forth in claim 1, wherein said converter is constituted by a flip-flop governed by clock pulses derived from a crystal-oscillator time base, a comparator responsive to the output of the demodulator to produce an output that depends on the logic level of d-c applied thereto, the comparator output being applied to the input terminal of the flip-flop to produce when the logic level is high a change of state at the leading edge of the clock pulse resulting in the generation of a pulse, the width of the pulse being a multiple of the crystal-oscillator period.

3. A system as set forth in claim 1, wherein said demodulator is a synchronous demodulator having two electronic elements operating in phase opposition, the output of the summing amplifier being applied directly to one of the elements and being applied through an inverter to the other element.

4. A system as set forth in claim 1, including means to render said demodulator operative only when the magnetic field is in a steady-state condition.

5. A system as set forth in claim 1, wherein said primary includes an excitation source constituted by a full-wave rectifier operated from an a-c power line whose output is applied to the electromagnet in a polarity which is periodically reversed at a rate which is a sub-multiple of the power line frequency.

6. A system as set forth in claim 1, wherein said summing amplifier compares said input signal with said pulse-modulated reference voltage to produce an output that represents the difference therebetween.

7. A system as set forth in claim 6, wherein the output of the summing amplifier is applied to said demodulator through an error amplifier.

* * * * *